March 1, 1966  M. MASEL ET AL  3,238,523
CAPACITIVE ENCODER

Filed Feb. 21, 1962

MARVIN MASEL
ANDREW WOERNER
CARL L. VRABEL
INVENTORS

BY S. A. Giannatana
George B. Oujevolk
ATTORNEYS

March 1, 1966 M. MASEL ET AL 3,238,523
CAPACITIVE ENCODER
Filed Feb. 21, 1962 4 Sheets-Sheet 3

MARVIN MASEL
ANDREW WOERNER
CARL L. VRABEL
INVENTORS

BY S. A. Giarratana
George B. Oujevolk
ATTORNEYS

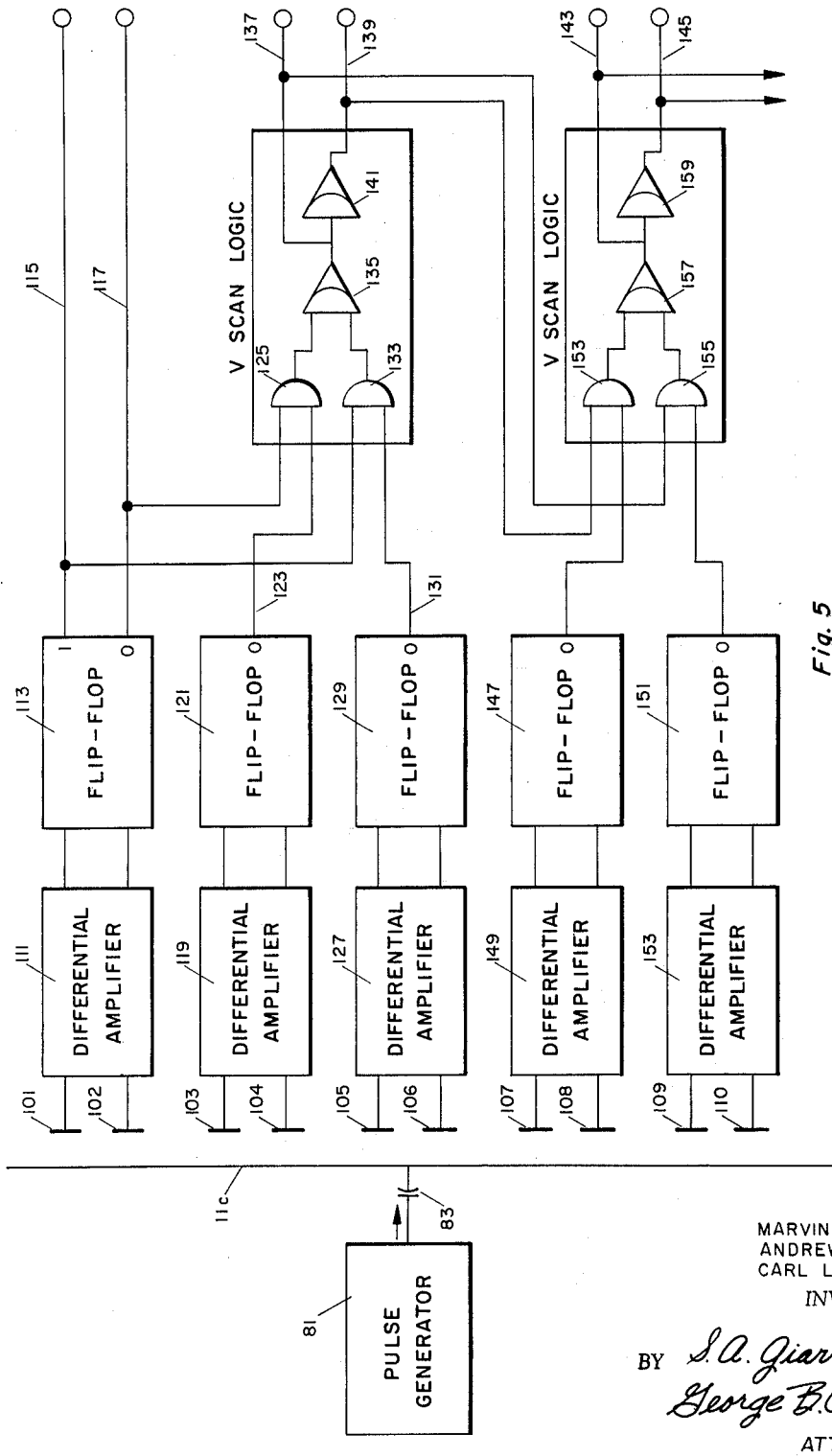

United States Patent Office 3,238,523
Patented Mar. 1, 1966

3,238,523
CAPACITIVE ENCODER
Marvin Masel, West Englewood, Andrew Woerner, Oradell, and Carl L. Vrabel, Ridgewood, N.J., assignors to General Precision Inc., Little Falls, N.J., a corporation of Delaware
Filed Feb. 21, 1962, Ser. No. 174,759
6 Claims. (Cl. 340—347)

This invention relates to encoders for converting position into a digital code, and more particularly to such an encoder which produces digital output by varying capacitances with the input position and detecting the difference in these capacitances to produce the digital output.

Prior to the present invention, many different types of encoders were known for performing the function of translating mechanical position into a digital code. Usually in these apparatus of the prior art, as well as in the present invention, the input position is the angular position of an input shaft and the apparatus produces output signals digitally representing this angular position. For example, one common such encoder of the prior art makes use of brushes riding on circular tracks of a disc rotated by the input shaft. The disc tracks are made up of alternately conducting and insulating segments in order to produce at the brushes a digital code representing the angular position of the input shaft. The brushes of this type of encoder are subject to wear, which, in addition to the problem properly aligning the brushes, makes reliable operation difficult to obtain for segment widths of less than 0.02 inch. The resolution with which this type of encoder can represent mechanical position is limited accordingly.

Because of these limitations other kinds of encoders have been developed, such as those employing optical techniques, magnetic techniques and synchronous transformers. Some of these encoders of the prior art have extremely high resolution, but to obtain this high resolution other desirable characteristics have been sacrificed. For example, many of these encoders of the prior art have a slow readout speed. Others require bulky, complex and expensive readout circuitry. Some of the encoders of the prior art are sensitive to thermal variation, some require a large amount of maintenance, and some present difficult manufacturing problems. The encoder of the present invention achieves a high resolution without the drawbacks encountered in the encoders of the prior art.

The encoder of the present invention comprises a rotor and a stator. The rotor is provided with an electrically conducting pattern on a surface which rotates closely adjacent to but slightly spaced from a conducting pattern on a surface of the stator. The conductive patterns on the rotor and the stator provide a plurality of capacitances which vary with the angular position of the rotor. By comparing various ones of these capacitances, a digital code is produced representing the angular position of the rotor. This structure provides an encoder with high resolution and this result is achieved with a faster readout than was heretofore obtainable with encoders having equivalent resolution. Also the encoder of the present invention does not require complex electronic readout circuitry, which makes encoders of the prior art with equivalent resolution bulky and expensive. With the differential capacitance encoder of the present invention, the entire capacitance between the discs is read out instead of reading out only one set of bits only at one reading station. Therefore, even if some of the least significant bits are mutilated, this will not affect the accuracy of the reading. Also, each binary position presents a different capacitance which provides the reading. Furthermore, the encoder of the present invention is not temperature sensitive and can provide the angular position of a rotor turning at a high speed, which permits it to have a wide application.

Accordingly, a principal object of the present invention is to provide an improved encoder of the type which converts mechanical position into a digital code.

Another object of the present invention is to provide an encoder of the type described with a high resolution and a fast readout.

A still further object of this invention is to provide an encoder of the type desired which has high resolution and which is relatively easy to manufacture.

A still further object of this invention is to provide an encoder of the type described which has a high resolution and which is relatively insensitive to temperature changes.

Further objects and advantages of the present invention will become readily apparent as the following detailed description of the invention unfolds and when taken in conjunction with the drawings, wherein:

FIG. 5 is a block diagram illustrating the readout circuitry of the encoder.

Figure 6:
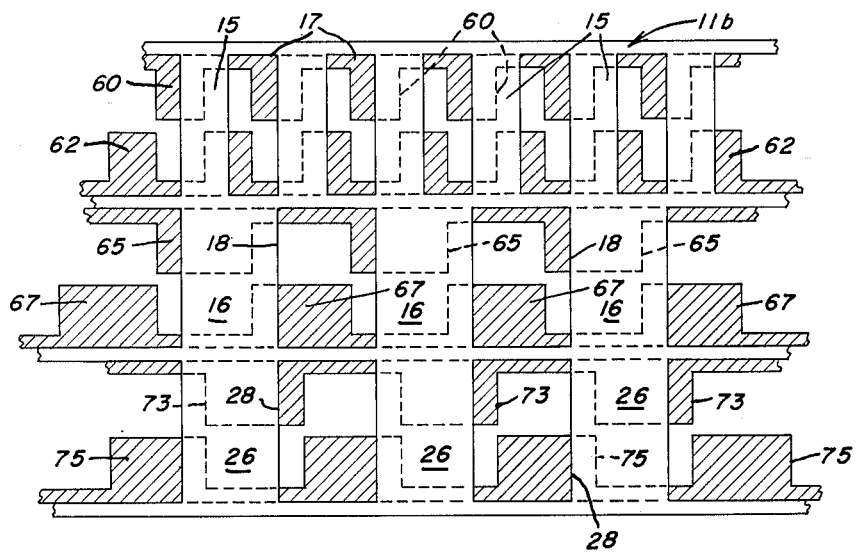

FIG. 6 graphically explains the logic system used.

Figure 1:
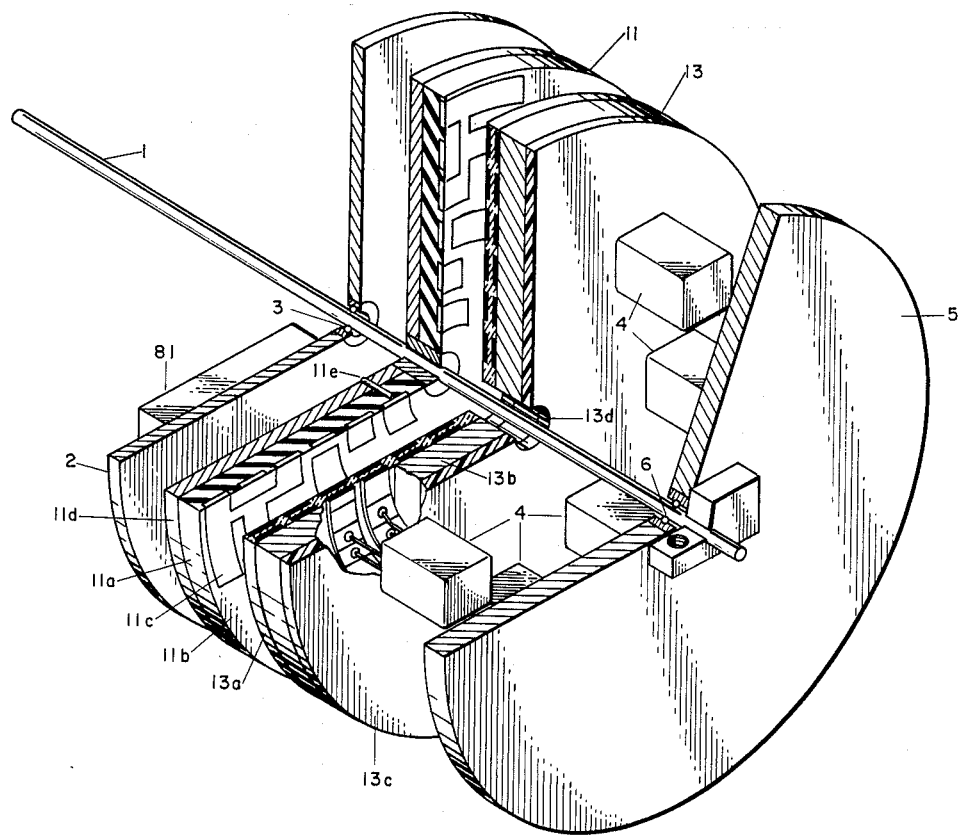
FIG. 1 is an isometric view of the encoder partially cut away to illustrate its structure.

As shown in FIG. 1, the encoder comprises a rotor 11 and a stator 13 adjacent the rotor 11. The rotor 11 comprises a disc 11a of insulating material, on the front face 11b of which there is formed an electrically conductive pattern 11c. On the back face of the rotor there is provided an electrically conductive sheet 11d, which is electrically connected to the conductive pattern 11c by means of an electrical connector 11e passing through the insulating disc 11a. The rotor is fixed to an input shaft 1 and rotates therewith. Mounted parallel to the sheet 11d slightly spaced therefrom is an electrically conductive plate 2, on which is mounted a pulse generator 81. The shaft 1 extends through the plate 2 and is rotatably mounted in the plate 2 by means of bearings 3. The stator 13 comprises a thin, disc-shaped sheet of mica 13a, the front face of which is parallel to and faces the rotor front face 11b, on which the conductive pattern 11c is formed. A pattern of electrically conductive segments is formed on the front face of the mica disc 13a and a plurality of capacitances exist between the conductive pattern 11c on the rotor and the conductive segments on the front face of the mica disc 13a. These capacitances vary as the rotor 11 is rotated. A conductive pattern of segments is formed on the back face 13b of the mica disc 13a to correspond precisely with the pattern on the front face of the mica disc 13a so that for each conductive segment on the front face of the mica disc 13a there is a corresponding conductive segment on the back face in the same position. The shapes of the segments on the back face of the mica disc 13a are mirror images of the shapes of the segments on the front face of the mica disc 13a so that each segment on the back face of the mica disc 13a precisely overlies its corresponding segment on the front face of the mica disc. Groups of the segments in the pattern on the back face 13b of the mica disc 13a are interconnected by conducting strips on the back face 13b. Because of the thinness of the mica disc 13a, each of the segments on the front face of the disc 13a is closely coupled in capacitance to its corresponding segment on the back face of the disc 13a. As a result the conductive pattern 11c on the rotor forms a different capacitance with each interconnected group of segments on the back face 13b of the mica disc 13a. These capacitances vary as the rotor is rotated. Mounted on the back face of the mica disc 13a is a circuit board 13c, on which readout circuitry modules 4 for the encoder are mounted. The readout circuitry modules 4 are connected through the board 13c to the interconnected groups of segments on the back face 13b of the mica disc. The shaft 1 passes freely through a hole 13d in the stator 13 and is rotatably mounted in an end plate 5 by means of bearings 6. The end plate 5, the stator 13 and the plate 2 are all mounted on and fixed to a housing not shown in FIG. 1.

When the encoder is operated the pulse generator 81 applies a pulse to the plate 2, which is passed by capacitive coupling to the conducting sheet 11d. From the sheet 11d the pulse is applied by means of the connection 11e to the conductive pattern 11c on the front face 11b of the rotor. The pattern 11c is all interconnected so that the pulse is applied to all of the pattern. The pulse is then passed by means of the capacitive couplings, which vary with the angular position of the rotor, to the groups of interconnected segments on the back face 13b of the mica disc 13a. The size of the pulses that are produced on the different groups of interconnected segments on the back face of the stator will vary with the angular position of the rotor because the capacitive coupling between the conductive pattern 11c and the groups of interconnected segments on the back face 13b of the mica disc will vary with the angular position of the rotor. The circuit modules compare the sizes of the pulses thus produced and by these comparisons generate digital output signals representing the angular position of the rotor. The circuit modules 4 in combination with the pulse generator 81 thus comprise means to compare the different capacitances between the conductive patterns on the stator and rotor and to generate digital signals from these comparisons representing the angular position of the rotor.

The conductive pattern 11c on the rotor 11 is in the form of a plurality of circular tracks concentric about the rotor axis. The conductive segments on the stator 13 are also formed as a plurality of tracks, one for each of the rotor tracks, concentric about the axis of the rotor with each stator track having the same radius as its corresponding rotor track. Each rotor track and its corresponding stator track provides an output signal for a digit of a binary number representing the angular position of the rotor. The radially outermost track of the rotor and the corresponding track on the stator produce a signal representing the least significant digit of the binary output of the encoder. The second and third tracks from the periphery of the rotor and the corresponding tracks on the stator produce a signal representing the second least significant digit in the binary output. Proceeding inwardly toward the axis of the rotor, the tracks produce signals representing successively more significant digits in the binary output with an adjacent pair of tracks on the rotor and the corresponding pair of tracks on the stator being used for each digit. Thus each digit except the least significant digit is represented by a signal produced from a pair of tracks on the rotor and the corresponding pair of tracks on the stator. The least significant digit is represented by a signal produced from only one track on the rotor and one track on the stator. This arrangement is used because the system makes use of V scan logic, which will be explained below.

Figure 2:
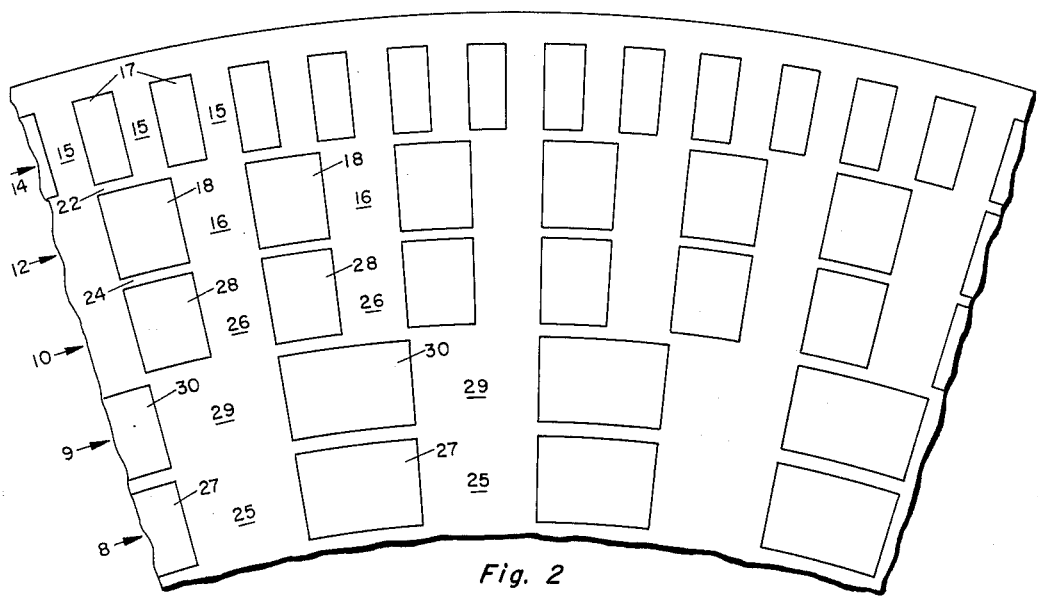
FIG. 2 is a fragmentary view of the front face of the rotor illustrating the conducting pattern thereon.

In the fragmentary view of FIG. 2 illustrating the conductive pattern 11c on the rotor, only the five radially outermost tracks 8, 9, 10, 12 and 14 on the rotor are shown. The pattern of the outer track 14 of the rotor 11 comprises substantially rectangular segments 15 of conducting material separated by segments 17 of insulating material. The segments 15 and 17 are not actually rectangular but are in the shape of truncated segments because their radially outer boundaries are arcs of a circle defining the radially outer side of the track 14, their radially inner boundaries are arcs of a circle defining the radially inner side of the track 14, and the boundaries between the segments 15 and 17 lie along radii of these circles. The tracks 10 and 12 on the rotor 11 are similar to the track 14. The track 12 is made up of alternate conducting and insulating truncated segments 16 and 18 and the track 10 is made up of alternate conducting and insulating truncated segments 26 and 28. In the embodiment shown for the purpose of illustration in FIG. 2, in track 12 the insulating segments 18 are of equal size and are congruent to the conducting segments 16 and in track 10 the insulating segments 28 are of equal size and congruent to the conducting segments 26. The tracks 10, 12 and 14 are all of equal width and accordingly the radial dimension of all the segments 15, 17, 16, 18, 26 and 28 are equal. The angular dimension, however, of the segments 15 and 17 is half that of the segments 16, 18, 26 and 28. The conducting segments 15, 16 and 26 are all interconnected by circular conducting strips 20, 22 and 24. The circular conducting strip 20 bounds the radially outer side of the track 14 and is connected to the conducting segments 15 along the radially outer sides thereof. The circular conducting ring 22 divides the tracks 12 and 14 and is connected to the segments 15 along their radially inner sides and to the segments 16 along their radially outer sides. The circular conducting ring 24 divides the tracks 10 and 12 and is connected to the segments 16 of track 12 along their radially inner sides and the segments 26 along their radially outer sides. Because the angular dimensions of the segments of the tracks 10 and 12 are twice that of the segments of the track 14, the tracks 10 and 12 will have half as many segments as the track 14. The other tracks of the rotor 11, consisting of tracks 9 and 8 and those not shown in FIG. 2, are similar to tracks 10, 12 and 14 except that the segments of each successive pair of tracks proceeding toward the axis of the rotor have twice the angular dimension as the segments in the preceding pair of tracks just as the segments of the tracks 10 and 12 have twice the angular dimension of the segments of the track 14. Also, as a result of this relationship, each successive pair of tracks proceeding towards the axis of the rotor will have half as many segments as the preceding pair of tracks. Thus the track 9 comprises alternate insulating and conducting segments 30 and 29, which have twice the angular dimension of the segments of tracks 10 and 12, and the track 8 comprises alternate insulating and conducting segments 27 and 25, which have twice the angular dimension of the segments of tracks 10 and 12. Moreover, the tracks 8 and 9 have half as many segments as the tracks 10 and 12. The radially innermost pair of tracks, which in cooperation with their corresponding pair of tracks on the stator produce the most significant digit in the binary output, will each have one insulating segment with an effective angle of 180° and one conducting segment with an angular dimension of 180°. The tracks 8 and 9 as well as the remaining tracks of the rotor not shown in FIG. 2 are separated by conducting rings which interconnect their conducting segments just as the conducting rings 22 and 24 separate the tracks 10, 12 and 14 and interconnect the conducting segments 15, 16 and 26. The conducting segments of the rotor tracks and the conducting rings which bound and divide the rotor tracks are one integral conducting pattern on the rotor as there are no actual physical boundaries between the conducting rings and the conducting segments of the rotor tracks. This conductive pattern is the pattern 11c of FIG. 1. The conducting pattern 11c of the rotor is a thin electrically conductive coating formed in the shape of the pattern on the insulating disc 11a of the rotor 11.

Figure 3:
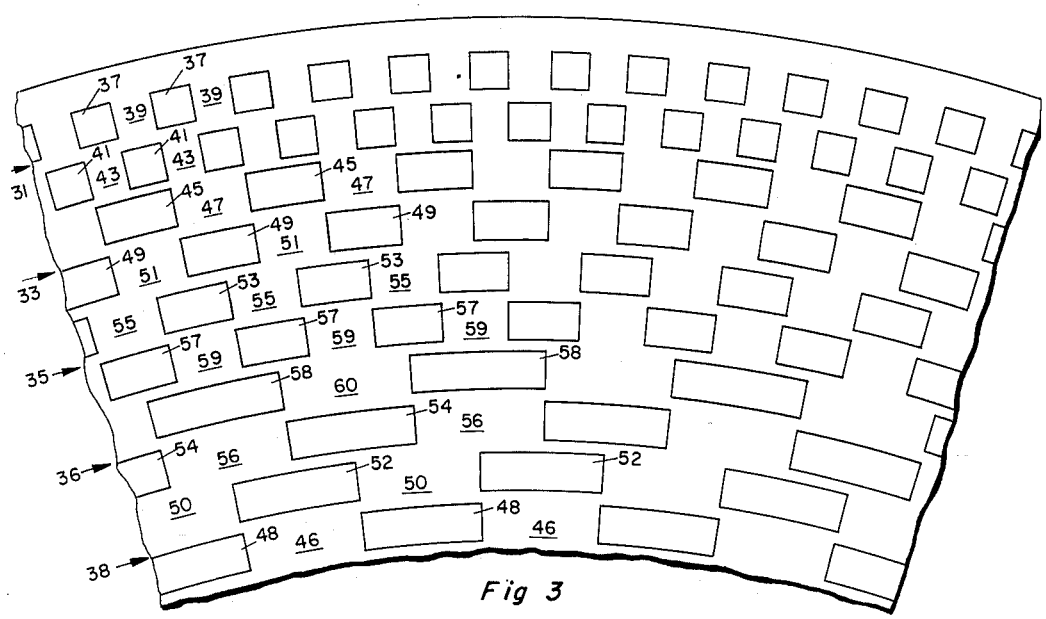
FIG. 3 is a fragmentary view of the front face of the stator, which faces the front face of the rotor, illustrating the conductive pattern thereon.

As pointed out above, the stator 13 also has a plurality of tracks, one corresponding to a different one of each of the rotor tracks with each stator track having the same radius as its corresponding rotor track. FIG. 3 illustrates a fragmentary portion of the front face of the mica disc 13a of the stator corresponding to the fragmentary portion of the rotor shown in FIG. 2. FIG. 3 thus illustrates the conductive segments comprising the tracks of the stator 13 on the front face of the mica disc 13a. In FIG. 3 the radially outermost track which corresponds to the track 14 on the rotor is designated by the reference number 31. The tracks on the stator corresponding to the tracks 12, 10, 9 and 8 of the rotor are designated by the reference numbers 33, 35, 36 and 38, respectively. Each of the stator tracks is bounded by circles concentric about the axis of the rotor having the same radii as the circles bounding the corresponding rotor tracks. Thus each of the stator tracks will be directly opposite to its corresponding rotor track. The stator track 31 on the front face of the mica disc 13a as shown in FIG. 3 comprises a first row of angularly spaced electrically conducting truncated segments 37 separated by insulating segments 39 having and angular dimension equal to that of the conducting segments 37. The track 31 also has a second row of angularly spaced electrically conducting truncated segments 41 separated by insulating segments 43 having an equal angular dimension to the conducting segments 41. The row of conducting segments 41 is spaced radially inward from the row of segments 37 and angularly spaced from the row of conducting segments 37 so that each of the segments 41 is in the same angular position as one of the insulating segments 39 and each of the conducting segments 37 is in the same angular position as one of the insulating segments 43 separating the conducting segments 41. The conducting segments 37 and 41 have equal angular dimensions so that the radially extending sides of each of the segments 37 are in the same angular position as the radially extending sides of the conducting segments 41. The radially inner sides of the conducting segments 41 coincide with the circle that defines the radially inner side of the track 31 and the radially outer sides of the segments 37 coincide with the radially outer side of the track 31. The radial dimensions of the segments 37 and 41 are equal and are less than half of the width of a track so that the radially inner sides of the segments 37 are spaced radially outward from the radially outer sides of the segments 41. The angular dimension of the segments 37 and 41 equals the angular dimension of the conducting segments 15 of the corresponding track 14 on the rotor 11. Each of the segments 37 and 41 occupy one incremental angular position, which is represented by a different binary number in the output of the encoder. The track 33 is similar to the track 31 having a first row of electrically conducting segments 45 and a second row of electrically conducting segments 49. The segments 45 are spaced radially outward from the segments 49 and also angularly spaced from the segments 49. The segments 45 are separated by insulating segments 47 of equal angular dimension to the segments 45 and the segments 49 are separated by insulating segments 51 of equal angular dimension to the segments 49. The segments 45 and 49 have the same angular dimension and the same radial dimension. Each of the segments 49 is in the same angular position as one of the insulating segments 47 and each of the conducting segments 45 is in the same angular position as one of the insulating segments 51. The radially outer side of the segments 45 coincide with the outer boundary of the track 33 and the radially inner sides of the segments 49 coincide with the inner boundary of the track 33. The radial dimensions of the segments 47 and 49 are less than half of the width of the track so that the radially inner sides of the segments 45 are spaced radially outward from the radially outer sides of the segments 49. The radially extending sides of the segments 45 are in the same angular position as the radially extending sides of the conducting segments 49. The angular dimension of the segments 45 and 49 are twice that of the segments 37 and 41 and are equal to the angular dimension of the conducting segments 16 of the corresponding rotor track 12. The track 35 is similar to the track 33 and is made up of a radially outer row of conducting truncated segments 53 separated by insulating segments 55 and a radially inner row of truncated conducting segments 57 separated by insulating segments 59. The track 35 differs from the track 33 only in that it is positioned radially inward from the track 33 and the segments 53 and 57 are angularly displaced one-half the angular dimension of the conducting segments 53 and 57 from the conducting segments 45 and 49, or in other words one incremental angular position. The reason for this arrangement will be apparent when the V scan logic is described below. The remaining tracks of the stator are formed in the same manner as the tracks 31, 33 and 35 except that each successive pair of tracks progressing toward the axis of the rotor comprises segments having an angular dimension of twice that of the preceding pair and each successive pair of tracks therefore have only half as many conducting segments as each preceding pair of tracks. Thus the track 36 comprises an outer row of alternate conducting and insulating segments 58 and 64 and an inner row of alternate conducting and insulating segments 54 and 56 having twice the angular dimension of the segments of tracks 33 and 35. Similarly the track 38 comprises an outer row of alternate conducting and insulating segments 52 and 50 and an inner row of alternate conducting and insulating segments 48 and 46 having twice the dimension of the segments of tracks 33 and 35. The radially innermost pair of tracks on the stator will each have a conducting outer segment occupying 180° and a conducting inner segment occupying the other 180°. The conducting segments in each successive pair of tracks progressing towards the axis will precisely occupy twice as many incremental positions on the stator as the conducting segments of the preceding pair of tracks. Thus the segments in tracks 36 and 38 each occupy four incremental positions compared to the two incremental positions occupied by the segments of tracks 33 and 35. The conducting segments of the inner track of each pair will be angularly displaced from the conducting segments of the outer track of such pair by an amount equal to one half the angular dimension of the conducting segments of such pair of tracks, just as the segments 53 and 57 are angularly displaced from the segments 45 and 49 by an amount equal to one half the angular dimensions of the segments 45, 49, 53 and 57. Thus the segments of tracks 38 are angularly displaced from the segments of tracks 36 by an amount equal to one half the angular dimensions of the segments of tracks 36 and 38 or in other words two incremental positions.

Figure 4:
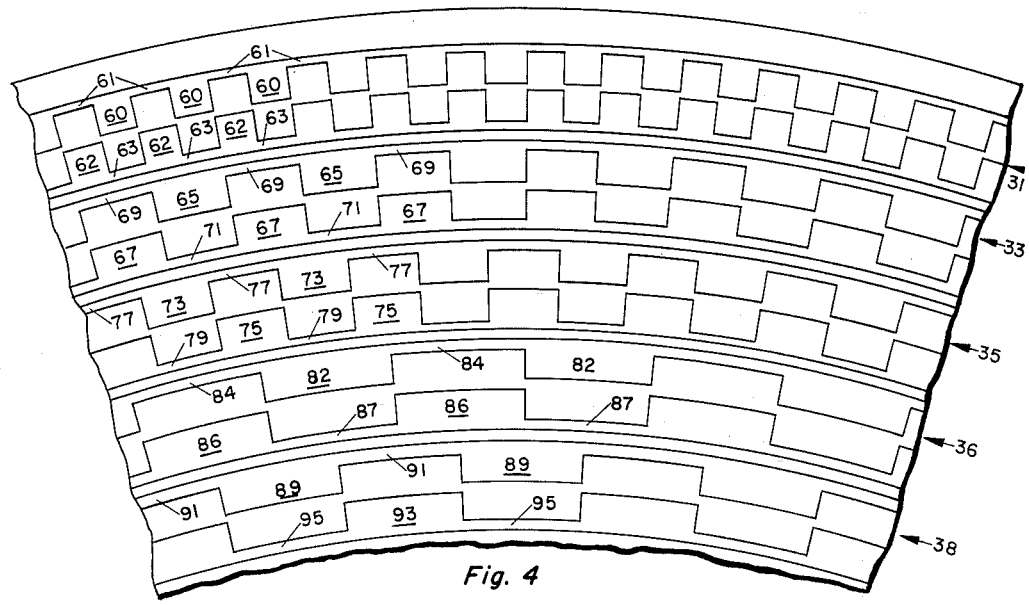
FIG. 4 is a fragmentary view of the back face of the stator illustrating the conductive pattern thereon.

The conducting segments of the tracks of the stator shown in FIG. 3 are formed as thin electrically conducting coatings on the insulating base comprising the mica disc 13a. FIG. 4 shows the pattern on the back face 13b of the mica disc 13a. As shown in FIG. 4, on the back face 13b there is a corresponding conducting segment for each of the segments on the front face of the same identical size as the segments on the front face and in the same precise angular position. The shape of each segment on the back face of the mica disc is a mirror image of its corresponding segment on the front face of the mica disc and each segment on the back face precisely overlies its corresponding segment on the front face so as to be closely capacitively coupled to its corresponding segment on the front face through the thin mica disc 13a. Thus on the back face 13b of the mica disc the track 31 comprises an outer row of segments 60 and an inner row of segments 62; the track 33 comprises an outer row of segments 65 and an inner row of segments 67; the track 35 comprises an outer row of segments 73 and an inner row of segments 75; the track 36 comprises an outer row of segments 82 and an inner row of segments 86, and the track 38 comprises an outer row of segments 89 and an inner row of segments 93. The segments of each row on the back face are all interconnected, the segments on each outer row of each track being joined at their outer radial edges by conducting strips and the segments of each inner row of each track being joined at their inner radial edges by conducting strips. Thus the segments 60 are interconnected by the conducting strips 61 and the segments 62 are interconnected by the conducting strips 63. Similarly the segments 65, 67, 73, 75, 82, 86, 89 and 93 are interconnected respectively by the conducting strips 69, 71, 77, 79, 84, 87, 91 and 95. In this manner the segments of the outer row of each track of the stator 13 are effectively interconnected and the segments of the inner row of each track of the stator 13 are effectively interconnected.

To assist the understanding of how the encoder operates, the rotor pattern has been shown in phantom in FIG. 6 overlying the stator pattern illustrating how the rotor pattern is positioned relative to the stator pattern to which it is closely adjacent.

In FIG. 6, the insulating regions of the code pattern 11c on the front face of rotor 11 are represented as being in the nature of apertures, i.e., underlying portions of the pattern on stator 13 are shown in solid line rather than in broken line as is the case for portions of the stator pattern which underlie conductive portions of the rotor pattern. To further clarify the representation in the figure, the portions of the stator pattern "visible" through the "apertures" are hatched. It will also be noted from inspection that the stator pattern shown in FIG. 6 is that which is on back face, 13b, in order to show the interconnections between individual segments of the code pattern.

In FIG. 6, the reference numerals designate the following previously-described elements and parts: 11c is the rotor code pattern generally; 15, 16 and 26 are conductive segments of code pattern 11c; 17, 18 and 28 are nonconductive segments of code pattern 11c; 60, 62, 65, 67, 73 and 75 are conductive segments of the stator code pattern.

Because of the small distance between the front face of the rotor 11 and the front face of the mica disc 13a, the conductive pattern 11c on the rotor will be capacitively coupled to the conductive segments on the front face of the mica disc, which segments in turn are capacitively coupled to their corresponding segments on the back face of the mica disc. The rotor and stator in effect comprise a plurality of differential capacitors with the conductive pattern 11c of the rotor providing one set of plates of the capacitors, which are commonly connected, and the different rows of conducting segments on the stator forming the other plates of the capacitors. The capacitances of these various differential capacitors will vary as the position of the conductive rotor pattern is changed with respect to the conductive stator pattern. For example, when the rotor pattern is positioned so that the conductive segments 15 of the track 14 are opposite the conductive segments 37, then the capacitance between the conductive segments 37 and the conductive segments 15 will be high. This capacitance will decrease continuously as the rotor is rotated from this position to a position in which the conductive segments 15 are in the precise same angular position as the conductive segments 41, or in other words through one incremental angular position. Meanwhile, as the rotor is being rotated in this manner, the capacitance between the conductive segments 15 and the conductive segments 41 is increasing. When a pulse is applied to the conductive pattern 11c of the rotor it will be transmitted from the conductive segments 15 to the conductive segments 37 and 41. These pulses will be transmitted to the corresponding interconnected segments on the back face of the misa disc 13a so that one pulse will be transmitted to the interconnected outer row of segments 60 and another pulse will be transmitted to the interconnected inner row of segments 62. The size of the pulses produced on the inner row of segments 62 and the outer row of segments 60 depends upon the capacitive coupling between the segments 15 and the segments 37 and 41. If the rotor 11 is in a position overlying more area of the segments 37 than of the segments 41, then a larger pulse will be produced on the outer row of segments 60 than on the inner row of segments 62, and if the rotor is in a position whereby the conducting segments 15 overlie more area of the conducting segments 41 than of the conducting segments 37, then a greater pulse will be transmitted to the inner row of segments 62 on the backface of the mica disc 13a than to the outer row of segments 60. If a larger pulse is produced on the outer row of segments 60 than on the inner row of segments 62, then this means that the least significant digit in the binary number representing the position of the rotor is a 0, and if the row of segments 62 has a larger pulse than the row of segments 60, then the least significant digit of the binary number is 1. Thus when the rotor is in a position where the conducting segments 15 are overlying more of the conducting segments 37 than of the conducting segments 41, the least significant digit of the binary number representing the angular position of the rotor is 0, and when the rotor 11 is in a position in which the conductive segments 15 overlie more of the segments 41 than of the segments 37, the least significant digit of the binary number representing the angular position of the rotor will be 1, and the output signals from the interconnected rows of segments 60 and 62 on the back side of the mica disc 13a will represent this least significant digit. The logical differentiation between 0 and 1 may best be understood by a study of FIG. 6. In a similar manner the interconnected rows 65 and 67 in track 33 will receive pulses from the conductive segments 16 when the rotor is pulsed. Pulses will be transmitted from the segments 16 to the conductive segments 45 and 49. The pulses transmitted to the conductive segments 45 are then transmitted through the thin mica disc 13a to the interconnected conductive segments 65 and the pulse transmitted to the conductive segments 49 is relayed to the interconnected conductive segments 67. The size of the pulses produced on the interconnected segments 65 and on the interconnected segments 67 will depend also upon the position of the rotor. If the rotor is in a position in which the conductive segments 16 overlie more of the conductive segments 45 than of the conductive segments 49, then a larger pulse will be transmitted via the conductive segments 45 to the conductive segments 65 than will be transmitted via the conductive segments 49 to the conductive segments 67. Thus in track 33 a larger pulse would be produced on the interconnected segments 65 than on the interconnected segments 67. In a similar manner the relative size of the pulses produced on the interconnected segments 75 and 73 in the track 35 will depend upon the relative position of the conductive segments 26 to the conductive segments 53 and 57. The pulses thus produced on the interconnected segments on the back face of the stator 13 in the tracks 33 and 35 represent the second least significant digit. It will be noted that the output pulses produced from the track 33 will not be the same as those produced from the track 35 because of the displacement of the segments in the track 33 from those in track 35. The output from only one of the tracks 33 and 35 is used to indicate the second least significant digit in the binary output and which track is selected to represent the second least significant digit is determined by the V scan logic to be described below. In a similar manner output signals are produced from the other tracks of the stator representing the other digits in the binary output of the encoder. Thus output signals are produced representing all the binary digits of the binary number representing the angular position of the rotor.

FIG. 5 illustrates how the output signals from the interconnected segments on the back face of the mica disc 13a are utilized to produce conventional binary output signals. As shown in FIG. 5, the pulse generator 81 applies a pulse to the electrically conductive pattern 11c on the front face of the rotor through a capacitive coupling which is represented in FIG. 5 by the capacitor 83. The capacitor 83 represents the capacitive coupling between the plate 2 and the conductive sheet 11d on the back face of the rotor. The pattern 11c on the front face of the rotor 11, which pattern is illustrated in detail in FIG. 2, is represented in FIG. 5 by a capacitor plate. This pulse is then transmitted by means of capacitive couplings described above to the interconnected rows of segments on the back face 13b of the mica disc 13a. These rows of interconnected segments are represented in FIG. 5 by the capacitor plates 101 through 110 for all of which the conductive pattern 11c forms a common other capacitor plate. The capacitor plates 101 through 110 represent the rows of interconnected segments 60, 62, 65, 67, 73, 75, 82, 86, 89 and 93, respectively. The member 11c will also form a common capacitor plate for other second capacitor plates for each interconnected row of segments on the back face of the stator not shown in FIG. 4. These additional capacitors have also not been shown in FIG. 5 to simplify the drawings. The representation of the rotor conductive pattern as a common capacitor plate for a large number of second capacitor plates representing the interconnected rows of segments on the back face of the mica disc 13a is an accurate representation of the actual physical arrangement of the stator and rotor since the conductive rotor pattern 11c is capacitively coupled to the individual interconnected rows on the back face of the mica disc 13a via the conductive pattern on the front face of the mica disc 13a. The representation becomes more complete if it is considered that the capacitance between the plate 11c and each of the plates 101 through 110 varies as the rotor 11 is rotated.

The pulses produced on the plates 101 and 102 are applied to inputs of a differential amplifier 111, which in response thereto sets a flipflop 113. If the pulse on plate 101 is larger than the pulse on plate 102 the differential amplifier 111 will set the flipflop 113 in its zero state, and if the pulse on plate 102 is larger than the pulse on plate 101 the differential amplifier will set the flipflop 113 in its one state. When the flipflop 113 is in its one state it will produce an output on line 115 of plus 10 volts and on line 117 of plus 0.5 volt, and when the flipflop 113 is in its zero state it will produce on line 117 plus 10 volts and on line 115 plus 0.5 volt. These output signal voltages on lines 115 and 117 represent the least significant digit of the binary output of the system. When the output on line 115 is plus 10 volts and the output on line 117 is plus 0.5 volt, the binary digit 1 will be represented, and when the voltages are reversed on lines 115 and 117 the least significant digit represented will be 0. Thus when the rotor is in a position such that the conducting segments 15 overlie more of the conducting segments 37 than of the conducting segments 41, the capacitance between the plate 11c and the plate 101 will be greater than the capacitance between the plate 11c and the plate 102. As a result a larger pulse will be produced on plate 101 than on plate 102 and the differential amplifier 111 will set the flipflop 113 in its zero state. Therefore plus 0.5 volt will be produced on output line 115 and plus 10 volts on output line 117. In this manner the output signal voltages on lines 115 and 117 will represent that the least significant digit is 0. Similarly, when the conducting segments 15 overlie more of the conductive segments 41 than of the conductive segments 37, the capacitance between the plate 11c and the plate 102 will be greater than the capacitance between the plate 11c and the plate 101 and a larger pulse will be produced on the plate 102 than on the plate 101. As a result the differential amplifier 111 will set the flipflop 113 in its one state which accordingly will produce an output signal of plus 10 volts on the output line 115 and plus 0.5 volt on the output line 117, thus representing that the least significant digit is 1. In this manner the output signals from the track 31 of the stator are used to represent the least significant digit of the binary output.

The pulses produced on plates 103 and 104, which are the pulses produced on the segments 65 and 67, respectively, are applied to a differential amplifier 119 which in response to these pulses sets a flipflop 121. When the pulse on plate 103 is larger than on plate 104, the differential amplifier 119 will set the flipflop 121 in its zero state and when the pulse on plate 104 is larger than the pulse on plate 103 then the differential amplifier 119 will set the flipflop 121 in its one state. When the flipflop 121 is set in its one state it will produce 0.5 volt on its output line 123 and when the flipflop 121 is set in its zero state it will produce an output voltage of plus 10 volts on the line 123. The line 123 is connected to the input of an AND gate 125 which is controlled by the signal voltage on line 117 from the flipflop 113. When a 10 volt output is produced on line 117 by the flipflop 113 indicating that the least significant digit is a zero, then the voltage on line 123 will be passed through the AND gate 125, but when the output of the flipflop 113 represents the binary digit 1, the voltage on line 117 will be 0.5 volt and the AND gate 125 will not be enabled, thus preventing the voltage on line 123 from being passed through the AND gate 125. The pulses produced on plate 106 is larger than the pulse on plate 105, the interconnected segments 73 and 75 respectively in track 35 of the stator, are applied to the inputs of a differential amplifier 127, which in response to these pulses sets a flipflop 129. When the pulse on plate 105 is larger than the pulse on plate 106, the differential amplifier 127 will set the flipflop 129 in its zero state and when the pulse on plate 106 is larger than the pulse on plate 105, the differential amplifier 127 will set the flipflop 129 in its one state. When the flipflop 129 is in its zero state it will produce an output voltage on line 131 of plus 10 volts, and when the flipflop 129 is in its one state it will produce an output voltage on line 131 of plus 0.5 volt. The line 131 is applied to an AND gate 133 which is controlled by the signal on the output line 115 of the flipflop 113. When the voltage on line 115 is plus 10 volts, indicative of the least significant digit being 1, the AND gate 133 is enabled and passes the voltage on line 131, and when the voltage on line 115 is 0.5 volt, indicative of the least significant digit being 0, the AND gate 133 is not enabled and does not pass the voltage on line 131. The outputs of the AND gates 125 and 133 are applied to the inputs of an inverter 135. It will be seen that when the output signal voltages on lines 115 and 117 indicate that the least significant digit is 0, the AND gate 125 will be enabled, and when the output signal voltages on lines 115 and 117 indicate that the least significant digit is 1, the AND gate 133 will be enabled. The inverter 135 thus will receive a voltage from either line 123 or line 131, depending upon what the least significant digit is. The inverter 135 in response to receiving 0.5 volt from either the AND gate 125 or the AND gate 133 will produce an output voltage of plus 10 volts and in response to receiving an input voltage from either of the AND gates 125 or 133 of plus 10 volts will produce an output voltage of plus 0.5 volt. The second least significant digit in the output from the system is represented on lines 137 and 139. The line 137 is connected directly to the output of the inverter 135 and the line 139 is connected to an output of an inverter 141, the input of which is connected to the output of the inverter 135. When the output signal voltage of the inverter 135 is plus 10 volts, the inverter 141 will produce an output voltage of 0.5 volt on line 139 and when the output signal voltage of the inverter 135 is 0.5 volt, the inverter 141 will produce an output voltage of plus 10 volts on line 139. When the output on line 137 is plus 10 volts and the output on line 139 is 0.5 volt, the second least significant digit represented by these signal voltages will be 1, and when these voltages are reversed the digit represented will be 0.

Thus it will be seen that the output voltages on lines 137 and 139, which represent the second least significant digit, are controlled by the pulses produced either on plates 103 and 104 or the pulses produced on plates 105 and 106, depending upon what the least significant digit is. If the least significant digit is 0, then the pulses produced on plates 103 and 104 will control the output signal voltages on lines 137 and 139, and if the least significant digit is 1, then the pulses on plates 105 and 106 will control the signal voltages on lines 137 and 139. Thus when the output from track 31 of the stator represents 0, the track 33 will be selected to produce the output representing the second least significant digit and when the output from the track 31 represents 1, the track 35 will be selected to produce the signal representing the second least significant digit. It will be noted that when the track 33 is selected and the output pulse produced on plate 103 is greater than the output pulse produced on plate 104, the flipflop 121 will produce an output signal on line 123 of plus 10 volts, which will cause plus 0.5 volt to be produced on line 137 and plus 10 volts to be produced on line 139, and thus the second least significant digit represented will be 0. Similarly when the track 33 is selected and the output pulse on plate 104 is greater than the output pulse on plate 103, the voltages on lines 137 and 139 will be reversed and the digit represented will be 1. When the track 35 is selected, the pulses produced on plates 105 and 106 control the output signal voltages on lines 137 and 139 in the same manner to represent 0 when the pulse on plate 105 is greater than the pulse on plate 106, and to represent 1 when the pulse on plate 106 is greater than the pulse on plate 105. The pulses produced on plates 107 and 108 from track 36 and the pulses produced on plates 109 and 110 from track 38 control output voltages on lines 143 and 145 to represent the third least significant digit in the same manner that the outputs from the tracks 33 and 35 control the output voltages on lines 137 and 139. The pulses produced from the tracks 36 and 38 control flipflops 147 and 151 through differential amplifiers 149 and 153 in the same manner that pulses from track 31 control the flipflop 113 through the differential amplifier 111. The output voltages from flipflops 147 and 151 control the output signal voltages on lines 143 and 145 in the same manner that the output voltages from the flipflops 121 and 129 control the signal voltages produced on lines 137 and 139. The output from flipflop 147 is applied to an AND gate 153, which is controlled by means of the signal voltage on line 139 and the output voltage from flipflop 151 is applied to an AND gate 155, which is controlled by means of the signal voltage on line 137. The outputs from the AND gates 153 and 155 are applied to an inverter 157, the output of which is connected directly to the output line 143 and to the input of an inverter 159, the output of which is connected directly to an output line 145. By means of the AND gates 153 and 155 one of the tracks 36 and 38 is selected to control the output signal voltages to be produced on lines 143 and 145 in accordance with the second least significant digit represented by the signal voltages on lines 137 and 139, in the same manner that one of the tracks 33 and 35 is selected to control the signal voltage produced on lines 137 and 139 in accordance with the least significant digit represented by the signal voltages on lines 115 and 117. When the second least significant digit represented by the signal voltages on lines 137 and 139 is 0, the output from track 36 on plates 107 and 108 will control the signal voltages produced on lines 143 and 145 representing the third least significant digit and when the second least significant digit represented by the signal voltages on lines 137 and 139 is 0, then the output from track 38 plates 109 and 110 will control the signal voltages on lines 143 and 145 representing the third least significant digit. The output pulses from each successive pair of tracks after the tracks 36 and 38 progressing toward the axis of the rotor each control signal voltages on a pair of output lines representing successively higher significant digits in the same manner that the outputs from tracks 33 and 35 control the signal voltages representing the second least significant digit and the outputs from tracks 36 and 38 control the signal voltages representing the third least significant digit. One track of each pair will be selected to control the output signal voltages depending upon whether the next lower significant digit is a 1 or a 0. If the next lower significant digit is a 0, the outer track of the pair will be selected and if the next lower significant digit is a 1 then the inner track of the pair will be selected by circuitry just as is disclosed for the pair of tracks 33 and 35 and for the pair of tracks 36 and 38. This circuitry, which for the tracks 33 and 35 comprises the AND gates 125 and 133 and their interconnections and for the pair of tracks 36 and 38 comprises the AND gates 153 and 155 and their interconnections is referred to as V scan logic. The reason that this V scan logic is used, necessitating two tracks for each digit of the binary output except the least significant digit, is to prevent ambiguities in these outputs which might otherwise occur and obtain a more definite indication of what each digit should be. For example, if the track 33 alone arranged as shown in FIGS. 3 and 4 were used to indicate the second least significant digit, then whenever the conductive segment 15 was precisely over one of the segments 41, the segments 16 would overlie half of the conductive segments 45 and half of the conductive segments 49. For this reason whenever the segments 15 precisely overlie one of the segments 41, in which case the least significant digit output will be 1, the track 35 is caused to be selected by the V scan logic instead of the track 33. Because the segments 53 and 57 of the track 35 are displaced angularly from the segments 45 and 49 of the track 33 through half the angular dimension of these segments, this ambiguity does not occur in track 35 when the segments 15 are over the segments 41. In the same manner the ambiguity for the third least significant digit is prevented by use of the second track 38 in addition to the track 36 and for each digit other than the least significant digit the ambiguity is prevented by the use of a pair of tracks in the same manner.

The tracks 33 and 35 are positioned relative to the pattern on the rotor so that whenever the binary output represented by the voltages on lines 115 and 117 changes from a 1 to a 0 when the rotor is rotated through one incremental position in a clockwise direction over the stator tracks as shown in FIG. 3, the output signal voltages represented on lines 137 and 139 will change to represent the opposite digit from what it was representing. Similarly, the pattern in tracks 36 and 38 is arranged relative to the pattern in tracks 8 and 9 so that the output signal voltages produced on lines 143 and 145 will change to represent the opposite binary digit from what it was representing whenever the second least significant digit changes from a 1 to a 0 when the rotor is rotated through one incremental position in a clockwise direction over the stator tracks as shown in FIG. 3. The pattern in each pair of tracks on the stator is arranged relative to its corresponding pair of tracks on the rotor so that it will cause the output binary digit derived therefrom to change to the opposite from what it was whenever the next lower significant digit changes from a 1 to a 0 by the clockwise rotation of the the rotor through one incremental position over the stator tracks as shown in FIG. 3 and in FIG. 6.

By means of the principles of the present invention incorporated in the specific embodiment thereof described above, it is possible to provide encoders having high resolution with high readout speeds. For example, an encoder can be made in accordance with the present invention in which the segment widths are 0.001 inch. This means that an encoder producing a binary output with thirteen significant digits and having a diameter of less than four inches can be constructed. Furthermore, the angular position of such an encoder can be read out from the stator in one-fourth of a microsecond. This means that the angular position could be read out while the rotor was rotating at a speed in excess of 1200 r.p.m. In fact the limitation of how fast the rotor can rotate and a readout be obtained is determined not by the readout speed, but by how fast the bearings will permit the rotor to rotate. Once the pulses are read out from the stator it takes only two microseconds for the readout circuitry to convert the output pulses to the signal voltages representing the binary output. This encoder will remain accurate over a wide temperature range, for example from −65° C. to +100° C. The encoder will have a long life and be highly reliable. It is relatively inexpensive and has low power consumption. Finally, the encoder is small and compact.

If desired, the radial widths of the tracks can be increased without increasing the overall diameter of the encoder by making use of more than one stator or rotor. Also the segment patterns can be varied to produce coded outputs. These and many other modifications may be made without departing from the spirit and scope of the invention as defined in the appended claims.

What is claimed is:

1. An encoder comprising means defining a track having a set of first conducting segments spaced along said track and a set of second conducting segments spaced along said track at positions between said first segments insulated from said first segments, a third conducting segment adjacent said track slightly spaced therefrom and movable with respect to said track along said track, and means to compare the capacitance between said third segment and said first segments with the capacitance between said third segment and said second segments.

2. An encoder comprising means defining a track having a first plurality of conducting segments spaced along said track, said conducting segments having a dimension along said track equal to the dimension between said segments, a second conducting segment adjacent said track slightly spaced therefrom and movable with respect to said track along said track, said second segment having a dimension along said track equal to said dimension along said track of said first conducting segments, and means to detect a variation in capacitance between said second conducting segment and said first conducting segments.

3. An encoder comprising means defining a first track having a plurality of conducting segments spaced along said first track, means defining a second track adjacent said first track, extending parallel to said first track slightly spaced therefrom, movable with respect to said first track in a direction along said first track, and having a plurality of conducting segments spaced along said second track, the dimensions of said segments of said first and second tracks along said track being equal and equal to the distance between said segments of said first track and the distance between said segments of said second track, and means to detect variaation in the capacitance between the conducting segments of said first track and the conducting segments of said second track.

4. An encoder comprising means defining a first track having a plurality of first conducting segments spaced along said first track, means defining a second track having a plurality of second conducting segments spaced along said second track, said first segments having a dimension along said first track equal to the dimension along said first track between said segments, said second segments having a dimension along said second track equal to the dimension along said second track between said second segments and equal to twice the dimension of said first segments along said first track, a third conducting segment positioned adjacent to but slightly spaced from said first track, a fourth conducting segment positioned adjacent to said second track but slightly spaced therefrom, means to move said third conducting segment along said first track and said fourth conducting segment along said second track as a unit, means to detect variation in the capacitance between said third segment and said first segments, and means to detect variation in the capacitance between said fourth segment and said second segments.

5. An encoder comprising means defining a track having a set of first conducting segments spaced along said track and a set of second conducting segments spaced along said track at positions between said first segments, the dimensions of said first segments along said track being equal to the dimensions of said second segments along said track, a third conducting segment adjacent said track slightly spaced therefrom and movable with respect to said track along said track, the dimension of said third segment along said track being equal to the dimensions of said first and second segments along said track, and means to compare the capacitance between said third segment and said first segments with the capacitance between said third segment and said second segments.

6. An encoder comprising a thin sheet of insulating material, means defining a first pattern of conducting segments on one side of said sheet, means defining a conductive second pattern on the other side of said sheet including segments each overlying a different one of the segments of said first pattern and including means interconnecting different groups of the segments of said second pattern, means defining a conductive third pattern positioned adjacent said sheet on the side of said first pattern on a surface parallel to the side of said first pattern and movable with respect thereto, and means to detect variation in the capacitances between said third conductive pattern and said interconnected groups of segments of said second pattern and to generate therefrom digital signals representing the position of said means defining said conductive third pattern with respect to said thin insulating sheet.

References Cited by the Examiner
UNITED STATES PATENTS

| | | | |
|---|---|---|---|
| 2,873,440 | 2/1959 | Speller | 340—347 |
| 2,905,897 | 9/1959 | Giel | 340—347 |
| 3,015,814 | 1/1962 | Lippel | 340—347 |

MALCOLM A. MORRISON, *Primary Examiner.*

D. M. ROSEN, L. W. MASSEY, W. J. KOPACZ,
*Assistant Examiners.*